(12) United States Patent
Agnew

(10) Patent No.: US 9,322,909 B2
(45) Date of Patent: Apr. 26, 2016

(54) NEGATIVE OBSTACLE DETECTION WITH STEREO CAMERA AND LONG RANGE RADAR

(71) Applicant: Continental Automotive Systems, Inc., Auburn Hills, MI (US)

(72) Inventor: David Leslie Agnew, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 233 days.

(21) Appl. No.: 14/101,904

(22) Filed: Dec. 10, 2013

(65) Prior Publication Data

US 2014/0168001 A1 Jun. 19, 2014

Related U.S. Application Data

(60) Provisional application No. 61/736,753, filed on Dec. 13, 2012.

(51) Int. Cl.
*G01S 13/93* (2006.01)
*G01S 13/86* (2006.01)
*G01S 13/00* (2006.01)

(52) U.S. Cl.
CPC ............. *G01S 13/867* (2013.01); *G01S 13/931* (2013.01)

(58) Field of Classification Search
CPC ....... G01S 13/86; G01S 13/867; G01S 13/88; G01S 13/93; G01S 13/931; E01C 19/004; E01C 19/006
USPC ............. 342/27, 28, 61, 66, 70–72, 175, 176, 342/179, 195, 52, 55; 404/83, 101
See application file for complete search history.

(56) References Cited

U.S. PATENT DOCUMENTS

| | | | |
|---|---|---|---|
| 6,380,849 B1 * | 4/2002 | Eckstine | G01S 13/88 342/70 |
| 6,821,052 B2 * | 11/2004 | Zurn | E01C 19/006 404/101 |
| 7,295,154 B2 * | 11/2007 | Walton | G01S 13/931 342/70 |
| 8,306,672 B2 | 11/2012 | Nickolaou | |

* cited by examiner

*Primary Examiner* — Bernarr Gregory

(57) ABSTRACT

A negative obstacle detection system for a vehicle comprises a stereo camera mountable to the vehicle to provide a forward facing image and a long range radar mountable to the vehicle to emit a signal in a forward direction from the vehicle. An electronic control unit receives data from the stereo camera and the long range radar to determine if a negative obstacle may be located in a forward proximity to the vehicle.

15 Claims, 2 Drawing Sheets

US 9,322,909 B2

NEGATIVE OBSTACLE DETECTION WITH STEREO CAMERA AND LONG RANGE RADAR

CROSS REFERENCE TO RELATED APPLICATION

This application claims priority to U.S. Provisional Application No. 61/736,753 which was filed on Dec. 13, 2012 the entire contents of which is incorporated herein by reference.

TECHNICAL FIELD

The present disclosure relates to automotive vehicles, and more particularly to driver assistance systems or automotive vehicles.

BACKGROUND

The advancements in sensor technology available have led to the ability to improve safety systems for vehicles. Additionally, improving passenger comfort is desirable. Therefore, arrangements and methods for detecting and avoiding pot holes on roadways are becoming available. However, due to the geometry of sensor locations available relative to the possible pot holes detection in time to provide a desired response by the vehicle is typically only at low vehicles speeds and/or to rear suspension components. Also, the greater the vehicle speed the more damage or discomfort that is likely occur. Thus, improving the distance from the vehicle at which potholes can be detected is desirable.

The background description provided herein is for the purpose of generally presenting the context of the disclosure. Work of the presently named inventors, to the extent it is described this background section, as well as aspects of the description that may not otherwise qualify as prior art at the time of filing, are neither expressly nor impliedly admitted as prior art against the present disclosure.

SUMMARY

A negative obstacle detection system for a vehicle comprises a stereo camera mountable to the vehicle to provide a forward facing image and a long range radar mountable to the vehicle to emit a signal in a forward direction from the vehicle. An electronic control unit receives data from the stereo camera and the long range radar to determine if a negative obstacle may be located in a forward proximity to the vehicle.

A method of detecting a negative obstacle in proximity to a vehicle comprises performing a first detection analysis on an image provided by a stereo camera, performing a second detection analysis on an image provided by the stereo camera, and performing a third detection analysis on a signal received by a radar. An ECU utilizes the first detection analysis, the second detection analysis and the third detection analysis to determine whether a negative obstacle is present in a forward proximity to the vehicle.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
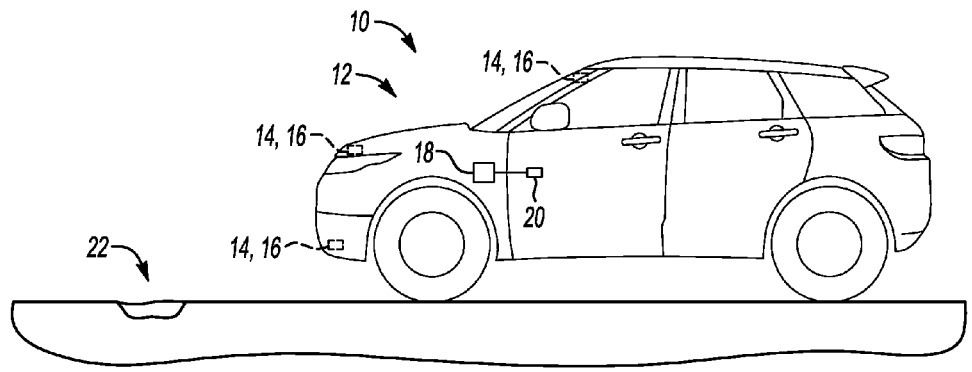
FIG. 1 is a schematic illustration of a vehicle utilizing a negative obstacle detection system of the present invention.
Figure 2:
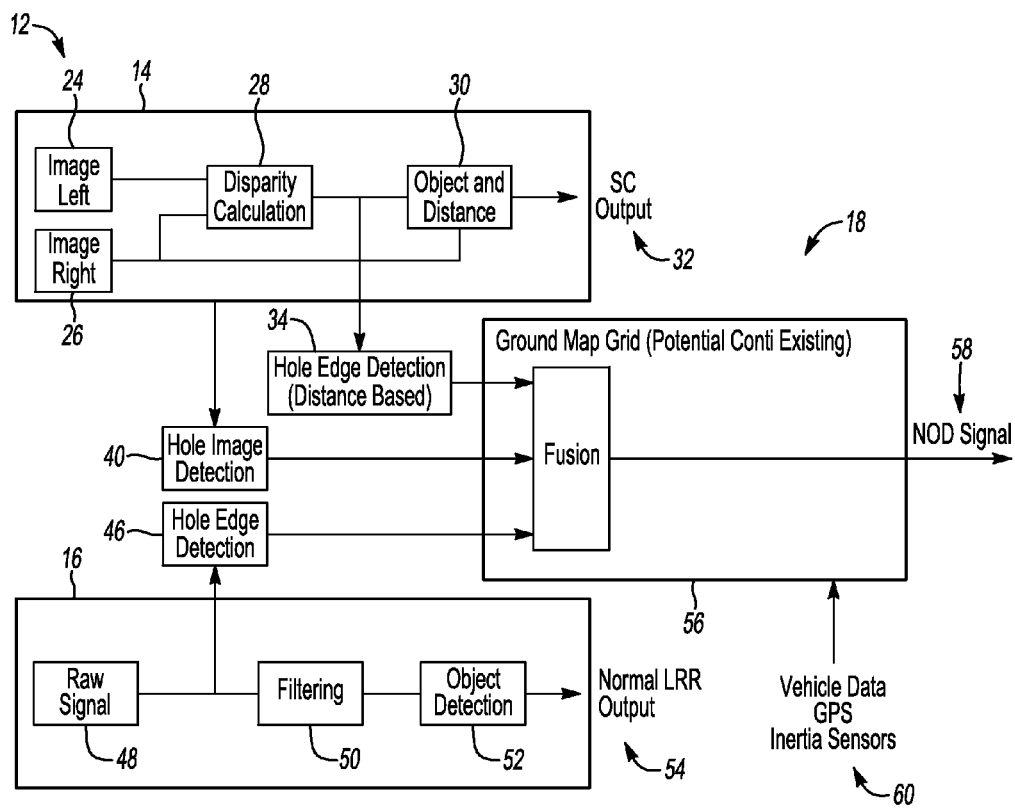
FIG. 2 is a schematic illustration of an exemplary negative obstacle detection system for the vehicle of FIG. 1.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a negative obstacle detection system 12 of the present invention. The obstacle detection system 12 includes a stereo camera 14 mounted to provide an image in front of the vehicle 10. Throughout the application the relative directions of forward and rear are in reference the direction which an operator for the vehicle 10 would primarily be facing when operating the vehicle 10. The vehicle 10 may also be a motorcycle.

A long range radar 16 is also mounted to the vehicle 10 and directed toward a similar area as the camera 14. Several mounting locations for the camera 14 and radar 16 are illustrated in FIG. 1. The camera 14 and radar 16 may be mounted at the same or different locations on the vehicle 10. Other mounting locations may also be desirable. One skilled in the art would be able to determine the desired mounting location for the camera 14 and the radar 16 to provide the information required by the obstacle detection system 12, as explained below.

The camera 14 and radar 16 are connected to an electronic control unit (ECU) 18. The ECU 18 analyzes data from the camera 14 and the radar 16, as described below, to detect negative obstacles 22, i.e. potholes. The system 12 may detect negative obstacles 22 at an increased distance from the vehicle 10, e.g. 40 meters. The ECU 18 may be connected to another vehicle system 20 to provide a signal for altering vehicle 10 behavior when a negative obstacle 22 is detected. The vehicle system 20 may be a steering system, a brake system, a suspension control system, etc. The vehicle 10 behavior may be altered in one or more ways to avoid the negative obstacle 22 or to minimize effects of the negative obstacle 22 on the vehicle 10.

Referring to FIGS. 1-5, the camera 14 is a stereo camera providing a left image 24 and a right image 26. A disparity calculation is performed comparing the differences in the left image 24 and the right image 26, shown at 28. The ECU 18 analyzes the left image 24 and the right image 26 and identifies an object 22 and a distance the object 22 is located from the vehicle 10, shown at 30. This is gives a stereo camera output, shown at 32.

Figure 3:
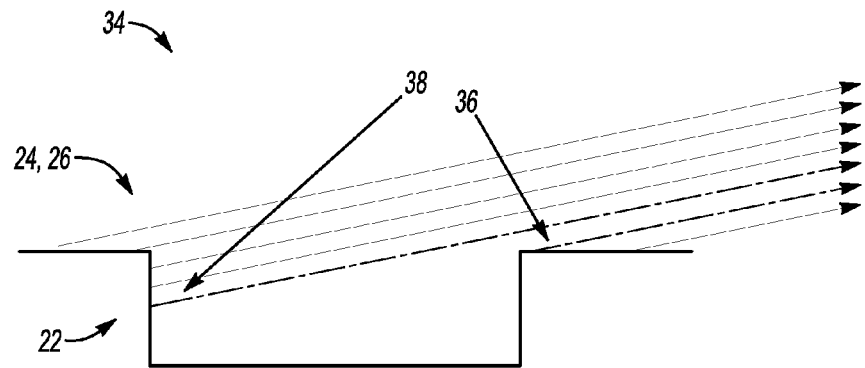
FIG. 3 is a schematic illustration of a first detection analysis performed by the negative obstacle detection system for the vehicle of FIGS. 1-2.
Figure 4:
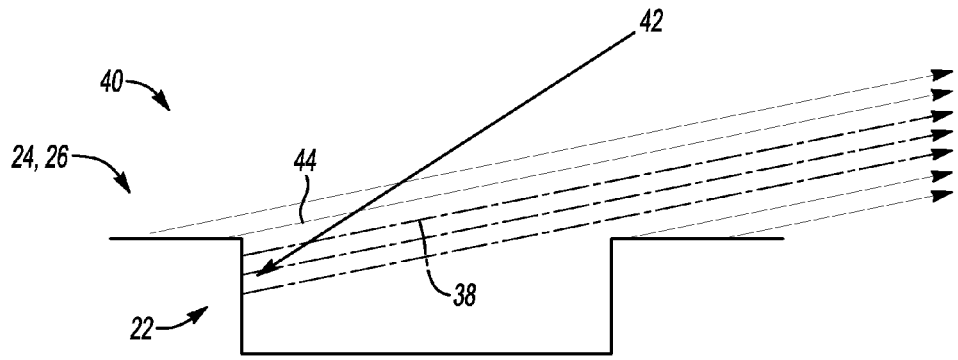
FIG. 4 is a schematic illustration of a second detection analysis performed by the negative obstacle detection system for the vehicle of FIGS. 1-2.

Using the left image 24 and the right image 26 the ECU 18 performs a first detection analysis 34, e.g. hole edge detection shown in FIG. 3. The hole edge detection 34 is a comparison of differences within the left and/or right image 24, 26 that are caused by the edge of a negative obstacle 22. FIG. 3 shows an example image 24, 26 using hole edge detection 34. The image 24, 26 has a first reflection 36 that is from the road directly prior to the negative obstacle 22. A second reflection 38 is from within the negative obstacle 22, i.e. the side of the pothole. The hole edge detection 34 is a comparison of the difference in distance that is measured between the first reflection 36 and the second reflection 38. The difference in distance between the first reflection 36 and the second reflection 38 is greater than it would be if there were no pothole 22. The difference results from the edge of the pothole 22 causing the second reflection 38 to be reflecting off a surface that is farther from the vehicle 10 than it should be. The hole edge detection 34 is one indicator that a negative obstacle 22 may be present.

The ECU 18 also performs a second image analysis, 40. The second image analysis is a hole image detection, shown in FIG. 4. The hole image detection 40 is a analyzes the image 24, 26 and detects the shadow, shown at 42 that is formed in the pothole 22. The first and/or second image 24, 26 will have a difference in light within the pothole 22 than on the road proximate to the pothole. The image 24, 26 has again has the second reflection 38 from within the negative obstacle 22, i.e. the side of the pothole. Additionally, a third reflection 44 is from the road directly following the negative obstacle 22. The hole image detection 34 is a comparison of the difference light on the image 24, 26 between the second reflection 38 and the third reflection 44. The difference results from the shadow 42 that is created in the pothole 22 causing the second reflection 38 to be darker than it should be. The hole image detection 40 is another indicator that a negative obstacle 22 may be present.

Figure 5:
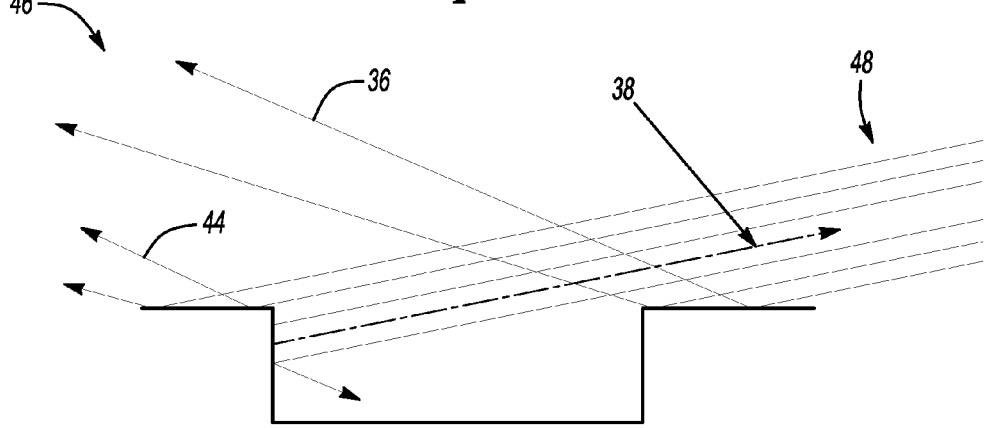
FIG. 5 is a schematic illustration of a third detection analysis performed by the negative obstacle detection system for the vehicle of FIGS. 1-2.

Finally, a third detection element 46 is performed the by radar 16. FIG. 5 illustrates the radar 16 using of hole edge detection 46. The radar 16 emits a signal 48 which is reflected back to the vehicle 10 when an object is present. The radar 16 signal 48 should reflect off the road in a known manner, as shown by the first reflection 36 and the third reflection 44 which reflected off the road proximate to the pothole 22. However, the change in road surface resulting from the pothole 22 causes the second reflection 38 to be directed back to the vehicle 10. The vehicle receives the raw reflected signal 48 and filters the signals it receives, shown at 50, and when the second reflection 38 is detected the radar 16 recognizes that an object 22 is present, shown at 52, i.e. the radar recognizes the side of the pothole 22 as an object. The hole edge detection by the radar 16 is a third manner of indicating that a negative obstacle 22 may be present. This is gives a radar output signal, shown at 54.

The ECU 18 combines the first detection element 30, the second detection element 40 and the third detection element 44 to form a ground map grid 56. Additional information 60 from other vehicle systems may also be used. For example, vehicle data, inertia sensors, GPS etc. The ground map grid 56 uses all three detection elements 30, 40, 44 and the additional information 60 to determine whether a negative obstacle 22 is present. When the ECU 18 determines a negative obstacle 22 is present a negative obstacle detection (NOD) signal 58 is sent to at least one other vehicle system 18 to provide appropriate action.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A negative obstacle detection system for a vehicle comprising:
   a stereo camera mountable to the vehicle to provide a forward facing image;
   a range radar mountable to the vehicle to emit a signal in a forward direction from the vehicle;
   an electronic control unit to receive data from the stereo camera and the radar to determine if a negative obstacle may be located in a forward proximity to vehicle;
   performing with the electronic control unit a first detection analysis on an image provided by the stereo camera;
   performing with the electronic control unit a second detection analysis on the image provided by the stereo camera;
   performing with the electronic control unit a third detection analysis on a signal received by the radar; and
   utilizing the first detection analysis, the second detection analysis, and the third detection analysis to determine with the electronic control unit whether a negative obstacle is present in a forward proximity to the vehicle.

2. The display system of claim 1, wherein the electronic control unit identifies a first reflection as a distance from the road to the vehicle immediately prior to the detected object, a second reflection as a distance from the road to a portion of the detected object, and a second reflection as a distance from the road to the vehicle immediately following the detected object.

3. The display system of claim 2, wherein performing the first detection analysis further comprises performing a hole edge detection and a hole image detection using at least one image provided by the stereo camera.

4. The display system of claim 3, wherein the electronic control unit performs the hole edge detection by:
   comparing the first reflection on the image and the second reflection on the image to determine a difference in distance between the first reflection and the second reflection,
   determining an object is present when the difference in distance between the first reflection and the second reflection is greater than expected.

5. The display system of claim 3, wherein the electronic control unit performs the hole image detection by:
   comparing the second reflection on the image and the third reflection on the image to determine a difference in light between the second reflection and the third reflection,
   determining an object is present when the difference in light between the second reflection and the third reflection is greater than expected.

6. The display system of claim 2, wherein performing the third detection analysis further comprises performing a hole edge detection using the signal received by the radar.

7. The display system of claim 6, wherein the electronic control unit performs the hole edge detection by:
   comparing the second reflection and the third reflection to determine a difference in distance between the second reflection and the third reflection,
   determining an object is present when the difference in distance between the second reflection and the third reflection is greater than expected.

8. A method of detecting a negative obstacle in proximity to a vehicle comprising:
   performing a first detection analysis on an image provided by a stereo camera;
   performing a second detection analysis on an image provided by the stereo camera;

performing a third detection analysis on a signal received by a radar; and utilizing the first detection analysis, the second detection analysis and the third detection analysis to determine whether a negative obstacle is present in a forward proximity to the vehicle.

9. The method of claim 8, wherein the electronic control unit identifies a first reflection as a distance from the road immediately prior to the detected object to the vehicle, a second reflection as a distance from a portion of the object to the vehicle, and a third reflection as a distance from the road immediately following the detected object to the vehicle.

10. The method of claim 9, wherein performing a first detection analysis further comprises performing a hole edge detection using the image provided by the stereo camera.

11. The method of claim 10, further comprising:

comparing the first reflection and the second reflection to determine a difference in distance between the first reflection and the second reflection; and determining an object is present when the difference in distance between the first reflection and the second reflection is greater than expected.

12. The method of claim 9, wherein performing a second detection analysis further comprises performing a hole image detection using the image provided by the stereo camera.

13. The method of claim 12, further comprising:

comparing the second reflection and the third reflection to determine a difference in light between the second reflection and the third reflection, determining an object is present when the difference in light between the second reflection and the third reflection is greater than expected.

14. The method of claim 9, wherein performing the third detection analysis further comprises performing a hole edge detection using the signal received by the radar.

15. The method of claim 14, further comprising:

comparing the second reflection and the third reflection to determine a difference in distance between the second reflection and the third reflection; and determining an object is present when the difference in distance between the second reflection and the third reflection is greater than expected.

* * * * *